United States Patent
Kordon et al.

(10) Patent No.: US 8,731,946 B2
(45) Date of Patent: May 20, 2014

(54) METHOD AND APPARATUS FOR GENERATING OR CUTTING OR CHANGING A FRAME BASED BIT STREAM FORMAT FILE INCLUDING AT LEAST ONE HEADER SECTION, AND A CORRESPONDING DATA STRUCTURE

(75) Inventors: Sven Kordon, Wunstorf (DE); Peter Jax, Hannover (DE); Johannes Boehm, Goettingen (DE)

(73) Assignee: Thomson Licensing, Issy-les-moulineaux (FR)

( * ) Notice: Subject to any disclaimer, the term of this patent is extended or adjusted under 35 U.S.C. 154(b) by 552 days.

(21) Appl. No.: 12/737,007

(22) PCT Filed: May 11, 2009

(86) PCT No.: PCT/EP2009/055663
§ 371 (c)(1),
(2), (4) Date: Dec. 1, 2010

(87) PCT Pub. No.: WO2009/146998
PCT Pub. Date: Dec. 10, 2009

(65) Prior Publication Data
US 2011/0158326 A1 Jun. 30, 2011

(30) Foreign Application Priority Data
Jun. 2, 2008 (EP) .................................... 08157417

(51) Int. Cl.
*G10L 19/00* (2013.01)
(52) U.S. Cl.
USPC ........... 704/500; 704/501; 704/503; 704/504; 704/200
(58) Field of Classification Search
CPC . G10L 19/00; G10L 19/0017; G10L 2019/00; G10L 2019/0004
USPC ........... 348/441; 704/500, 501, 503, 504, 200
See application file for complete search history.

(56) References Cited

U.S. PATENT DOCUMENTS

| 5,677,918 | A  | * | 10/1997 | Tran et al. ...................... 714/748 |
| 2001/0026561 | A1 | * | 10/2001 | Morris et al. ................. 370/487 |

(Continued)

FOREIGN PATENT DOCUMENTS

| EP | 1830575 | 9/2007 |
| WO | WO03038814 | 5/2003 |

OTHER PUBLICATIONS

Mi Suk Lee;Hong Kook Kim;Seung Ho Choi;Eung Don Lee;Do Young Kim, A Forward-Backward Voice Packet Loss Concealment Algorithm for Multimedia over IP Network Services, 2005, Advances in Multimedia Information Processing—PCM 2004, Lecture Notes in Computer Science vol. 3332, pp. 381-388.*

(Continued)

*Primary Examiner* — Qi Han
(74) *Attorney, Agent, or Firm* — Robert D. Shedd; Jerome G. Schaefer

(57) ABSTRACT

In frame-based bit stream formats the data required for decoding a current frame are usually stored within the data section for that frame. One exception is the mp3 bit stream where data for a current frame is stored in previous frames. If the decoder did not receive the required previous frame, decoding of the current mp3 frame is skipped. The invention can be applied for such bit streams, in an archival mode, a streaming mode and a sample-exact cutting of an archival mode. In the streaming and cutting modes, new headers are established. The number of frames required for initializing the decoder status is signalized in the header, as well as a consistency check value in the streaming mode. These frames are used for decoder initialization but not for decoding samples or coefficients. For a sample-exact cutting, for the frame at which the cut shall occur, the number of samples or coefficients to be muted is also indicated in the header. The invention can be applied for the hd3 audio file format for lossless extension of an mp3 bit stream.

1 Claim, 2 Drawing Sheets

(56) References Cited

U.S. PATENT DOCUMENTS

Figure 1:
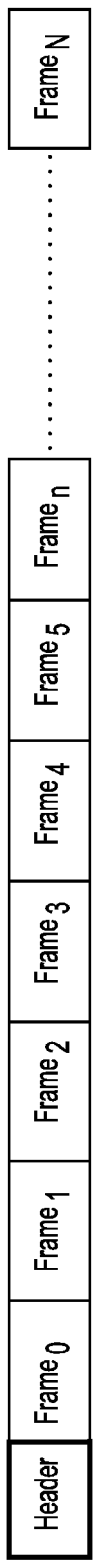

| | | |
|---|---|---|
| 2002/0097272 A1 | 7/2002 | Tanaka |
| 2004/0057704 A1* | 3/2004 | Katsuo et al. ............... 386/125 |
| 2005/0135295 A1* | 6/2005 | Walton et al. ............... 370/328 |
| 2005/0234731 A1* | 10/2005 | Sirivara et al. ............... 704/500 |
| 2006/0002431 A1* | 1/2006 | Seo et al. ..................... 370/522 |
| 2006/0241796 A1* | 10/2006 | Messer et al. ................. 700/94 |
| 2006/0265227 A1* | 11/2006 | Sadamura et al. ............ 704/503 |
| 2007/0136780 A1* | 6/2007 | Park ............................ 725/136 |
| 2007/0280438 A1 | 12/2007 | Pritchett et al. |
| 2008/0125891 A1 | 5/2008 | Sakakibara et al. |
| 2008/0183319 A1* | 7/2008 | Muramatsu .................... 700/94 |
| 2008/0270143 A1* | 10/2008 | Metz ............................ 704/500 |

OTHER PUBLICATIONS

Search Rept: Jul. 23, 2009.

* cited by examiner

METHOD AND APPARATUS FOR GENERATING OR CUTTING OR CHANGING A FRAME BASED BIT STREAM FORMAT FILE INCLUDING AT LEAST ONE HEADER SECTION, AND A CORRESPONDING DATA STRUCTURE

This application claims the benefit, under 35 U.S.C. §365 of International Application PCT/EP2009/055663, filed May 11, 2009, which was published in accordance with PCT Article 21(2) on Dec. 10, 2009 in English and which claims the benefit of European patent application No. 08157417.0, filed Jun. 2, 2008.

The invention relates to a frame-based data format with changeable format, the frames containing encoded signal data which for decoding of a current frame require access to previous frame data.

BACKGROUND

In frame-based bit stream formats the data required for decoding a current frame are usually stored within the data section for that frame.

An exception is the MPEG1 Audio Layer III bit stream with its bit reservoir technique, where data for a current frame is stored in previous frames. The position of the data is indicated in the bit stream by a pointer to the position in byte of the beginning of the main-data in the previous frame. If the decoder did not receive the required previous frame, decoding of the current mp3 frame is skipped.

INVENTION

The MPEG1 Audio Layer III bit stream does not have a bit stream header field for enabling sample-exact cutting.

The present invention can be applied for a data format or structure where an extension data stream provides lossless extension for a lossy base layer data stream for e.g. an audio signal, e.g. the hd3 audio file format for lossless extension of an mp3 bit stream, wherein decoding of a frame requires decoding of more than one previous frame and the bit stream format offers an archival mode and a streaming mode, as well as a sample-exact cutting feature of the bit stream.

'Archival mode' means that a file includes a single bit stream header and successive frames of encoded or decoded signal samples or coefficients (in particular audio samples), whereby decoding must start at the beginning of the file, i.e. with the frame following the bit stream header. 'Streaming mode' means that a coherent bit stream is separated into more than one package of data, each package starting with a single bit stream header followed by several frames, whereby decoding can start at each package.

Sample-exact cutting means generating as a new bit stream a partial section from an existing bit stream, thereby encoding or decoding only a subset of samples of that existing bit stream, wherein the first and the last decodable sample can be chosen arbitrarily.

The problem to be solved by the invention is to disclose a bit stream format that facilitates the initialisation of the decoder states at the beginning of a cut file or a streaming package. Depending on the frame, the number of previous frames involved in the decoder states recovery is different. A streaming mode file or a cut file can start at each frame and therefore the required number of previous frames for the decoder state recovery is missing.

This problem is solved by the methods and apparatus disclosed hereinbelow.

The inventive bit stream format can be generated or used at encoder side as well as at decoder side. Regarding decoder side, the invention is related to a corresponding decoder processing and the required bit stream header fields for initialising the decoder states at the beginning of the cut file or the stream package.

According to the invention, it is signalised in the bit stream how many frames are required for initialising the decoder states. This is performed explicitly by signalising within the bit stream header the number of frames required for the decoder status recovery. These frames are used for decoder initialisation but not for decoding samples or coefficients. For the sample-exact cutting, for the frame at which the cut shall occur, the number of samples or coefficients to be muted is indicated in the bit stream header, for enabling a sample-exact cutting beyond the frame borders.

The invention can be used e.g. in an hd3 encoder in order to allow two bit stream modes and sample-exact cutting of the bit stream. It is a specific solution because decoding of a frame of the second layer of the hd3 encoder bit stream requires more then one decoded frame of the first layer, whereas in most known frame-based audio formats each frame can be decoded independently from the other frames.

Coders that make use of backward adaptive prediction techniques can not use the inventive processing because it requires that all previously decoded samples are known for recovering the prediction states. Therefore such known bit streams include the prediction states for initialisation of the decoder after a defined number of coded samples, which is not true for the present invention.

In principle, the inventive method is suited for generating a frame based bit stream format file including at least one bit stream header section, said frames including encoded signal data, wherein data required for a decoding or an evaluation of data of a current frame can be contained in one or more previous frames, and wherein in said header information items are arranged representing:
  total number of samples per channel for said file;
  an 'archival mode' or a 'streaming mode' for said file;
  whether or not a decoding of said encoded signal data can start at the first frame of said file;
  if a decoding of said encoded signal data is not to start at said first frame of said file, the number of initial frames to mute while decoding states are initialised, and optionally, for a sample-exact cutting feature, the number of samples to mute in the corresponding frame;
  in said streaming mode, a value for identifying a previous super frame for a consistency check,
wherein in said archival mode, said file includes a single bit stream header section and successive ones of said frames, and a decoding of said encoded signal data is to start with the first one of said frames,
and wherein in said streaming mode said bit stream contains more than one super frame, each one of said super frames starting with a single bit stream header section followed by several ones of said frames, and a decoding of said encoded signal data can be initialised at each one of said super frames, and wherein said information item regarding the number of initial frames to mute signalises how many ones of initial frames in a current super frame are required for establishing data for initialising states of a decoding of said signal data before actually starting decoding of encoded signal data from the following frame or frames of said current super frame, such initial frames not being used for decoding the encoded signal data contained therein.

In principle, the inventive data structure is suited for a frame based bit stream format file including at least one bit stream header section, said frames including encoded signal data, wherein data required for a decoding or an evaluation of data of a current frame can be contained in one or more previous frames, and wherein in said header information items are arranged representing:
- total number of samples per channel for said file;
- an 'archival mode' or a 'streaming mode' for said file;
- whether or not a decoding of said encoded signal data can start at the first frame of said file;
- if a decoding of said encoded signal data is not to start at said first frame of said file, the number of initial frames to mute while decoding states are initialised, and optionally, for a sample-exact cutting feature, the number of samples to mute in the corresponding frame;
- in said streaming mode, a value for identifying a previous super frame for a consistency check, wherein in said archival mode, said file includes a single bit stream header section and successive ones of said frames, and a decoding of said encoded signal data is to start with the first one of said frames,
and wherein in said streaming mode said bit stream contains more than one super frame, each one of said super frames starting with a single bit stream header section followed by several ones of said frames, and a decoding of said encoded signal data can be initialised at each one of said super frames, and wherein said information item regarding the number of initial frames to mute signalises how many ones of initial frames in a current super frame are required for establishing data for initialising states of a decoding of said signal data before actually starting decoding of encoded signal data from the following frame or frames of said current super frame, such initial frames not being for use for decoding the encoded signal data contained therein.

In principle one inventive method is suited for cutting a section out of a frame based bit stream format file including a bit stream header section, said frames including encoded signal data, wherein data required for a decoding or an evaluation of data of a current frame can be contained in one or more previous frames, and wherein said header includes information items representing:
- total number of samples per channel for said file;
- an 'archival mode' for said file;
- a decoding of said encoded signal data is to start at the first frame of said file, wherein in said archival mode, said file includes a single bit stream header section and successive ones of said frames,
said method including the step of forming a cutting file by taking the required frames data from said bit stream and arranging a cutting header in front of these frames data, wherein said cutting header is derived from said header and in said cutting header:
- said total number of samples per channel for said file is replaced by the number of samples per channel for said cutting file;
- said archival mode is kept;
- said information item regarding decoding of said encoded signal data is to start at the first frame of said file is changed to decoding of said encoded signal data is to start later in said file;
- an information item is added regarding the number of initial frames to mute while decoding states are initialised.

In principle one inventive apparatus is suited for cutting a section out of a frame based bit stream format file including a bit stream header section, said frames including encoded signal data, wherein data required for a decoding or an evaluation of data of a current frame can be contained in one or more previous frames, and wherein said header includes information items representing:
- total number of samples per channel for said file;
- an 'archival mode' for said file;
- a decoding of said encoded signal data is to start at the first frame of said file, wherein in said archival mode, said file includes a single bit stream header section and successive ones of said frames,
said apparatus including means being adapted for forming a cutting file by taking the required frames data from said bit stream and arranging a cutting header in front of these frames data, wherein said cutting header is derived from said header, and in said cutting header:
- said total number of samples per channel for said file is replaced by the number of samples per channel for said cutting file;
- said archival mode is kept;
- said information item regarding decoding of said encoded signal data is to start at the first frame of said file is changed to decoding of said encoded signal data is to start later in said file;
- an information item is added regarding the number of initial frames to mute while decoding states are initialised.

In principle one inventive method is suited for changing a frame based bit stream file format, said bit stream including a header section, said frames including encoded signal data, wherein data required for a decoding or an evaluation of data of a current frame can be contained in one or more previous frames, and wherein said header includes information items representing:
- total number of samples per channel for said file;
- an 'archival mode' for said file;
- a decoding of said encoded signal data is to start at the first frame of said file, wherein in said archival mode, said file includes a single bit stream header section and successive ones of said frames,
said method including the step of generating from said archival mode file a 'streaming mode' bit stream by forming from every successive group of frames of said archival mode file a super frame of said streaming mode bit stream by taking the required frame data from said archival mode file and arranging a super frame header at the beginning of each super frame, wherein these super frame headers are derived from said header and in the first one of said super frame headers:
- said total number of samples per channel for said file is replaced by a first adapted number of samples per channel;
- an information item for 'streaming mode' instead of 'archival mode' is given;
- said information item regarding decoding of said encoded signal data is to start at the first frame of said file is kept, and in the following ones of said super frame headers:
- said total number of samples per channel for said file is replaced by a second adapted number of samples per channel;
- said information item for 'archival mode' is replaced by an information item for 'streaming mode';
- said information item regarding decoding of said encoded signal data is to start at the first frame of said file is replaced by an information item regarding decoding of said encoded signal data is not to start at said first frame;
- an information item is added regarding the number of initial frames to mute while decoding states are initialised;

optionally, an information item is added regarding the number of samples to mute in the frame where decoding of said encoded signal data is to begin, which number is '0';

an information item is added regarding consistency check data, the value of which is derived from the data of the previous super frame.

In principle one inventive apparatus is suited for changing a frame based bit stream file format, said bit stream including a header section, said frames including encoded signal data, wherein data required for a decoding or an evaluation of data of a current frame can be contained in one or more previous frames, and wherein said header includes information items representing:

total number of samples per channel for said file;
an 'archival mode' for said file;
a decoding of said encoded signal data is to start at the first frame of said file, wherein in said archival mode, said file includes a single bit stream header section and successive ones of said frames, said apparatus including means being adapted for generating from said archival mode file a 'streaming mode' bit stream by forming from every successive group of frames of said archival mode file a super frame of said streaming mode bit stream by taking the required frame data from said archival mode file and arranging a super frame header at the beginning of each super frame, wherein these super frame headers are derived from said header and in the first one of said super frame headers:

said total number of samples per channel for said file is replaced by a first adapted number of samples per channel;

an information item for 'streaming mode' instead of 'archival mode' is given;

said information item regarding decoding of said encoded signal data is to start at the first frame of said file is kept, and in the following ones of said super frame headers:

said total number of samples per channel for said file is replaced by a second adapted number of samples per channel;

said information item for 'archival mode' is replaced by an information item for 'streaming mode';

said information item regarding decoding of said encoded signal data is to start at the first frame of said file is replaced by an information item regarding decoding of said encoded signal data is not to start at said first frame;

an information item is added regarding the number of initial frames to mute while decoding states are initialised;

optionally, an information item is added regarding the number of samples to mute in the frame where decoding of said encoded signal data is to begin, which number is '0';

an information item is added regarding consistency check data, the value of which is derived from the data of the previous super frame.

In principle, the last-mentioned method can be used for decoding said streaming mode bit stream, further including the steps of:

when starting decoding of said streaming mode bit stream at said first super frame, the decoding of the encoded signal data starts at the first frame of that super frame using default decoder states;

when not starting decoding of said streaming mode bit stream at said first super frame, following a decoding initialisation or reset, a number 'muteFrames' of frames corresponding to said information item regarding the number of initial frames to mute is used for initialising the decoding states, and the decoding of encoded signal data starts at frame number muteFrames+1 of the current super frame using these decoding states;

when not starting decoding of said streaming mode bit stream at said first super frame, and consistency check data that were calculated from the previous super frame data is not consistent with corresponding consistency check data calculated from the current super frame, using a number 'muteFrames' of frames of the following super frame for re-initialising the decoding states starting decoding of encoded signal data at frame number 'muteFrames'+1 of that following super frame using these decoding states;

when not starting decoding of said streaming mode bit stream at said first super frame, and a super frame was decoded before and said consistency check data are valid, using the decoder states of the previously decoded super frame to decode the encoded signal data of the frames of the current super frame.

Advantageous additional embodiments of the invention are disclosed in the respective dependent claims.

The following description provides the corresponding bit stream information and the decoder processing for having one bit stream format that supports a streaming mode as well as an archival mode and that facilitates sample-exact cutting.

DRAWINGS

Figure 2:
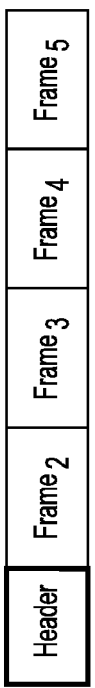
Figure 3:
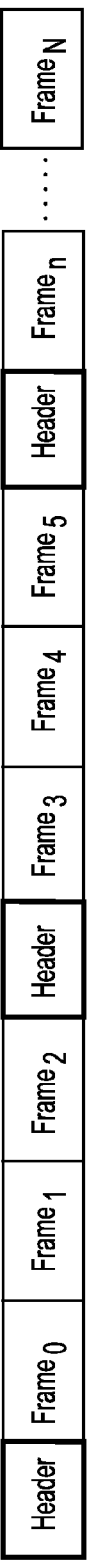
Figure 4:
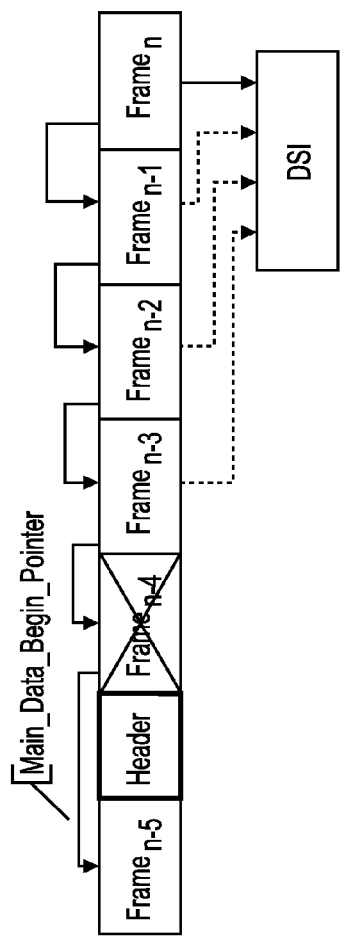
Figure 6:
Figure 5:
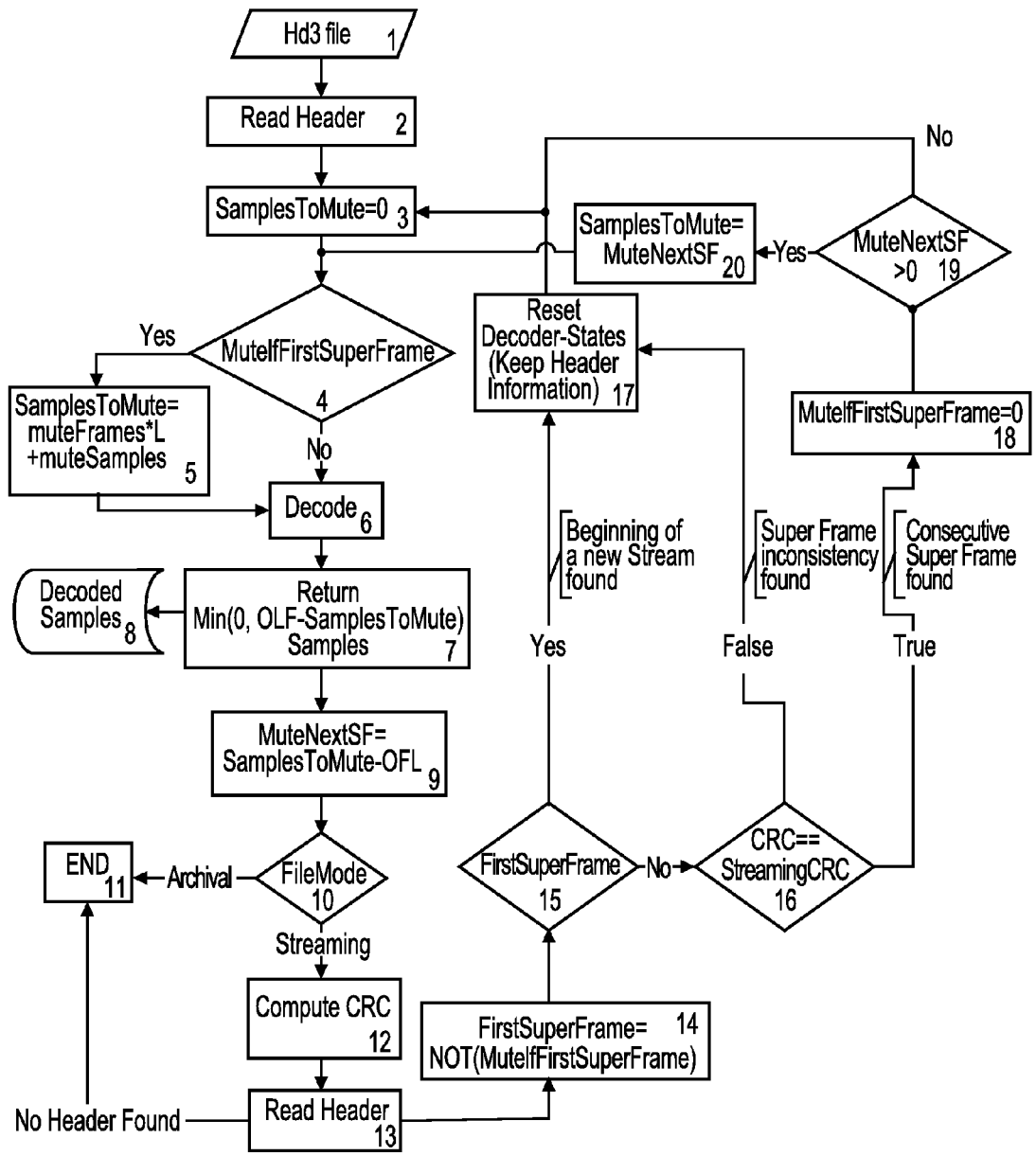

Exemplary embodiments of the invention are described with reference to the accompanying drawings, which show in:

FIG. 1 Structure of an archival mode bit stream;
FIG. 2 Structure of a cut archival mode bit stream;
FIG. 3 Structure of the streaming mode bit stream;
FIG. 4 Dependencies of the n-th frame, whereby decoding of frame$_{n-4}$ requires data stored in a previous super frame, and therefore it is invalid for stand-alone decoding of the super frame. Frame$_{n-3}$, frame$_{n-2}$ and frame$_{n-1}$ are required for initialising the decoder states of frame$_n$;
FIG. 5 Decoder flow chart for the processing of archival mode, cutting mode and streaming mode of the inventive bit stream format;
FIG. 6 Simplified HD3 file format.

EXEMPLARY EMBODIMENTS

The invention was made during the hd3 codec development. Therefore, the description is applicable to the current version of the hd3 bit stream format. However, the invention can be applied correspondingly to all frame based file formats that require knowledge of a number of previous frames for decoding a frame and wherein number is written into the bit stream header for initialising the decoder states, or for achieving sample-exact cutting by indicating the number of samples to mute of the decoded frame.

The hd3 codec processing enables storage, in a single file, of an mp3 file plus extension data for the bit-exact representation of the source of the mp3 file. The first version of the hd3 bit stream format was an archival format with one file header and successive data frames Frame$_0$, Frame$_1$, ... Frame$_n$, as shown in FIG. 1. For an easier understanding, the different layers of the hd3 codec are not depicted here, and it is assumed that the described coder requires a number of previously decoded frames to decode the current frame.

For different applications it might be useful to transform the archival format at decoder side into a streaming format, or to cut a short sequence out of the archival format. For example, cutting enables fast generation of short previews and the streaming format allows starting decoding without having the complete file received.

However, a problem to solve for sample-exact cutting and for the operation in streaming mode and archival mode is the initialisation of the decoder states in case the previous frames are missing. The following description explains the required bit stream information and decoder processing.

Archival Mode

The archival mode bit stream as shown in FIG. 1 consists of one file header at the beginning of the file, followed by signal data divided into frames, wherein each frame represents code representing a segment of L coded signal samples or coefficients.

The archival mode bit stream decoding can start only at the first frame because only there the decoder states are known (they are defined in every decoding standard). E.g., the below-mentioned Main_Data_Begin_Pointer in mp3 is set to zero for the first frame. By continuously decoding the following frames, the decoder states get initialised and a correct decoding of the samples is obtained. A main characteristic of the described format is that not all but only k, with $0 \leq k < K$, previously decoded frames are required to achieve correct results, wherein K is the maximal number of required decoded frames and K is a constant value that is known in the encoder and in the decoder. However, decoding of the required information from the previous frames without knowledge of other frames needs to be feasible.

The hd3 codec provides such feature by the independently decodable mp3 frames. However, the reconstruction of the bit-exact replica (i.e. lossless reconstruction) requires due to the mapping processing status information from three previously decoded mp3 frames, as described in application EP 08102308.7.

Furthermore, the MPEG1 Audio Layer III standard ISO/IEC 11172-3 includes the above-mentioned bit reservoir technique that allows storage of main data in previous frames. A main data begin pointer is used that points to the beginning of the main data located in a previous frame. Thus, decoding of single mp3 frames requires information from previous frames as well.

These issues are complicating the cutting or streaming of the said bit stream format due to the fact that the required information from previous frames is missing at the beginning of the streaming mode file or the cut file. FIG. 4 illustrates related issues that affect decoding-side cutting or streaming of the encoding-side (or transmitted, or recorded, or original) archival format. When starting decoding at the header of the bit stream without the data from $Frame_{n-5}$, $Frame_{n-4}$ can not be decoded because its Main_Data_Begin_Pointer points to non-available $Frame_{n-5}$ data. As well, the frames n-3 to n-1 can not be decoded correctly because their decoder states are not initialised correctly due to the missing data from the previous frames. However, following availability of data (e.g. spectral values) from three previous frames, although frames n-3 to n-1 are not decoded, the correct decoder states of the following frame can be reconstructed in a decoder states initialisation step/stage DSI by performing the mapping process described in EP08102308.7. The first frame with correctly initialised decoder states is $Frame_n$.

To overcome these problems, according to the invention, some extra information items are added to the bit stream header depicted in the following table. Based on these additional information items the decoder can decide if the processing will start with known default decoder states or with unknown decoder states:

TABLE 1

Section of the header of the inventive bit stream format

| Data field | Bit length | Contents |
| --- | --- | --- |
| OFL (original file length) | X | Total number of samples per channel corresponding to the payload of the following data. |
| FileMode | 1 | '0': Archival mode '1': Streaming mode |
| MuteIfFirstSuperFrame | 1 | '0': Decoding starts at the beginning (i.e. with the first frame or with the first package) of the file, i.e. decoding states have their default values '1': Decoding starts later in the file (or at a later package) |
| if(MuteIfFirstSuperFrame) { | | Information required for starting decoding later in the stream or at the beginning of a cut file |
| muteFrames | X | Number of frames to mute while initialising the decoder states |
| muteSamples | X | Number of samples to mute in the corresponding frame for sample-exact cutting |
| if(FileMode) { | | Information required in streaming mode |
| StreamingCheckSum } } | X | Value for identifying the previous super frame for a consistency check |

The 'MuteIfFirstSuperFrame' field of the bit stream header indicates whether or not decoding of the following frames requires an additional initialisation of the decoder states. If true (i.e. the flag is set), further information items are inserted into the bit stream header, which will be discussed in the following examples for cutting and streaming.

The bit stream header for the archival mode uses the 'OFL', 'FileMode' and 'MuteIfFirstSuperFrame' data fields only, wherein the values 'FileMode' and 'MuteIfFirstSuperFrame' are set to zero (or the corresponding flags are cleared) to indicate a non-cut archival file.

Cutting of the Archival Mode Bit Stream

Cutting is used at decoding side to separate a short subsection from a received or replayed complete coherent bit stream in archival mode. The bit stream mode of the cut file is equal to that of the archival mode format. FIG. 2 depicts a cut file produced from the archival mode file format shown in FIG. 1. Cutting can be used, for example, to get a short preview of the complete file. Instead of decoding and newly encoding the desired section, the required frames are just cut out from the input file and a new header is inserted in front of these cut-out data frames.

The problem with cutting is that for the decoding of the first frame of the cut-out data frames the data from the required previous frames are missing in case the preview or the cut-out section, respectively, does not start at the beginning of the complete bit stream. Therefore the cut file evaluates the 'MuteIfFirstSuperFrame' data field of the bit stream header indicating that the processing of the first frames merely initialises the decoder states and that the decoded samples of these frames are to be muted. The number of frames that are to be muted is indicated in the bit stream header in the 'muteFrames' field, and the number 'muteSamples' of samples that are to be muted is indicated in the header to enable sample-exact cutting instead of pure frame-exact cutting.

The following example explains in more detail how to create a cut file from an archival file:

Given values
L: Number of decoded samples per frame
$OFL_{orig}$: Total length of the input file in samples per channel
$X_{start}$: Number of the first sample of the archival file to be decoded for the cut file
$X_{end}$: Number of the last sample of the archival file to be decoded for the cut file Values to be determined
$OFL_{cut}$: Total length of the cut file in samples per channel
$Frame_{valid}$: First decodable frame with known decoder states
$Frame_{start}$: First decoded frame of the cut file
$Frame_{end}$: Last decoded frame of the cut file
$k_{napping}$: Number of frames required for mapping status initialisation, i.e. the number of frames required to recover the decoder states of $Frame_{valid}$
$k_{mp3}$: Number of invalid mp3 frames Get number of required previous frames
$Frame_{valid}$=floor ($X_{start}/L$)

Get $k_{napping}$ (which is the number of previous frames required for valid decoding of frame number $Frame_{valid}$, which number is known but may vary from frame to frame) and read the Main_Data_Begin_Pointer of (mp3-)frame number $Frame_{valid}$. Set $k_{mp3}$ equal to the number of frames to add in order to get a valid Main_Data_Begin_Pointer. For example, if the Main_Data_Begin_Pointer points to the previous frame of $Frame_{valid}$, set $k_{mp3}$ to '1'.

Computer header values
muteFrames=$k_{mp3}+k_{napping}$
$OFL_{cut}=X_{end}-X_{start}+1+L*muteFrames$
$Frame_{start}$=max(0, $Frame_{valid}$−muteFrames)
$Frame_{end}$=min(ceil($OFL_{orig}/L$), ceil($X_{end}/L$)) −1
muteSamples=$X_{start}-L*Frame_{start}$ wherein 'floor' rounds a specified decimal number to the closest integer towards negative infinity, and 'ceil' returns a value representing the smallest integer that is greater equal the argument of the ceil function Establish the corresponding header

| Data field | Value |
| --- | --- |
| OFL | $OFL_{cut}$ |
| FileMode | 0 |
| MuteIfFirstSuperFrame | 1 |
| muteFrames | muteFrames |
| muteSamples | muteSamples |

Create the cut file
Copy the header followed by the frames $Frame_{start}$ to $Frame_{end}$ For identification of a cut archival mode file, 'FileMode' is set to '0' and 'MuteIfFirstSuperFrame' is set to '1'. These properties will indicate to the decoder that the decoder states are to be initialised using the first 'muteFrame' frames parameter, and that the decoded samples of these frames are invalid.

Several frame-dependent values need to be found out for performing a cutting of the archival bit stream mode-file. However, the first step is finding the frame '$Frame_{valid}$' in which the first sample of the cut file is stored. For the computation of that first frame, corresponding delays in the core-codec processing may be introduced which, for easier understanding, are not considered in the example.

Next, the number of previous frames required for recovering the decoder states is to be obtained. Thus, the cut file must start with the frame that holds the data of the first frame involved in the decoder state recovery of '$Frame_{valid}$'. The obtained number of previous frames is written into the 'muteFrame' field of the bit stream header, such that the decoder knows that these frames are to be used only for initialisation of the decoder states and not for decoding samples.

For enabling a sample-exact cutting, an additional number of 'samples per channel to mute' ('muteSamples') can be indicated in the header as well. These samples will be decoded correctly by the decoder but will not be presented to the user. Therefore the decoded presented signal can start with a sample located anywhere within the frame, instead of starting at the beginning of the frame.

In each case, 'OFL' is the number of samples per channel that can be decoded with known decoder states. This is explained in more detail in the following Streaming bit stream mode section. Therefore the samples of the initialisation frames are to be added to the actual number of samples of the cut file. The decoder will automatically subtract these additional samples from the 'OFL' value in the decoder process. Further details are described in the Decoding processing section.

Streaming Mode

Using information items from the bit stream header depicted in Table 1, the archival bit stream mode can be transformed at decoding side into a streaming bit stream mode. 'Streaming mode' means that the frames of the archival bit stream are separated into successive packages, whereby each one of these packages is called a 'super frame' (SF) and has the same structure as an archival bit stream. A super frame starts with the corresponding bit stream section header (i.e. a super frame header) followed by frames of data. I.e., in comparison with the archival mode, in the streaming mode super frames each one having a header are repeatedly arranged in the bitstream. An example for such a streaming mode bit stream is depicted in FIG. 3.

The 'FileMode' data field of the bit stream header of each super frame carries the value '1' indicating the streaming mode, in which the decoder must decode several successive super frames in order to reconstruct all samples of the encoded file. The first super frame of a streaming mode stream is basically identical to the beginning of an archival mode file, but in the bit stream header the data fields 'FileMode' and 'OFL' carry values different than in an archival mode header. When the decoder starts decoding of the first super frame, the default decoder states are used and the first frame can be decoded directly without requiring any further information items.

However, a streaming mode bit stream can be replayed or decoded starting at each one of its super frames. But in that case the required data from previous frames for initialising the decoder states are missing. Therefore all super frames of a stream except the first super frame must indicate in the 'MuteIfFirstSuperFrame' data field that their first 'muteFrames' number of frames are to be used only for the decoder state recovery.

In streaming mode one must distinguish the decoding initialisation phase, where the decoding states are unknown, from the decoding phase, where the decoding states are known from previously decoded super frames. The corresponding type of phase is obtained at the beginning of the each super frame using the header information of the super frame. The header properties for both phases are shown in the following.

Decoding Initialisation Phase
FileMode=1
MuteIfFirstSuperFrame=0
AND decoding starts at the beginning of a new coherent bit stream in streaming mode.

The default decoder states are used and the decoding of the samples can start directly at the first frame of the super frame.
FileMode=1
MuteIfFirstSuperFrame=1
AND this is the first super frame to decode following a decoder initialisation or reset.

The first 'muteFrame' frames of the current super frame are used for initialising the decoder states, and the decoding of samples can start at frame number ('muteFrames'+1).
FileMode=1
MuteIfFirstSuperFrame=1
AND this is not the first decoded super frame AND the consistency check of the previous and current super frames has failed.

For the consistency check the 'StreamingCheckSum' data field of the header is used. Its value is obtained from the data of the previous super frame and is written into the 'StreamingCheckSum' data field of the following super frame, so that successive super frames can be identified. For example, a Cyclic Redundancy Check sum (CRC) or a hash value of frames, e.g. the last frame, of the previous super frame can be used. The decoder computes the CRC of the previous super frame and compares it with the value stored in the header of the current super frame. If this comparison fails the current decoder states are not valid for the decoding of the next super frame. Thus, the decoder states are to be re-initialised using the first 'muteFrames' number of frames of the next super frame. Decoding of samples starts at frame number ('muteFrames'+1).

The 'StreamingCheckSum' data field is not used in the first super frame of a coherent streaming mode bit stream because previous frames are not required and therefore the consistency check is superfluous.
Decoding Phase
FileMode=1
MuteIfFirstSuperFrame=1
AND a super frame was decoded before AND the consistency check is valid.

Thus, the decoder status of the previously decoded super frame can be used to decode the frames of the next super frame.

A typical streaming processing starts with an initialisation phase followed by several decoding phases. In the decoding phase the 'muteFrame' information is not used because the decoder states are initialised correctly by corresponding data from the previous super frame, and the data to which the 'Main_Data_Begin_Pointer' is pointing is available in the previous super frame. The decoder will only return to the initialisation phase if a new coherent bit stream will start (MuteIfFirstSuperFrame=0) or the 'StreamingCheckSum' is incorrect. In both cases the decoder states become invalid and are to be re-initialised.

The following example shows how to create a streaming mode bit stream from an already existing archival mode bit stream:
Given values
L: Number of decoded samples per frame
$OFL_{orig}$: Total length of the input file in samples per channel
M: Number of super frames with $M \leq ceil(OFL_{orig}/L)$
Values to be determined
NumFrames: Total number of frames
$M_{mean}$: Average number of frames per super frame
$Frame_{start}$: First frame of a super frame
$Frame_{end}$: Last frame of a super frame
$muteFrames_{SF}$: Number of frames for initialisation of the decoder states of the super frame
$StreamingCheckSum_{SF}$: Value for consistency check of the super frame
m: Number of currently written super frames with $0 \leq m < M$
Calculate total number of frames
  NumFrames=$ceil(OFL_{orig}/L)$, wherein 'ceil' returns a value representing the smallest integer that is greater equal the argument of the ceil function.
Calculate number of frames per super frame
$M_{mean}=ceil(OFL_{orig}/(M*L))$
Create first super frame (m=0)
Establish the corresponding header:

| Data field | Value |
| --- | --- |
| OFL | $M_{mean} * L$ |
| FileMode | 1 |
| MuteIfFirstSuperFrame | 0 |

Copy frames number '0' to $(M_{mean}-1)$.
Create following super frames $(1 \leq m < M)$
  Compute 'StreamingCheckSum': compute the Cyclic Redundancy Check sum of a defined part of the previous super frame and store the result in data field 'StreamingCheckSum$_{SF}$'.
  Obtain 'muteFrames': find all frames with an invalid Main_Data_Begin_Pointer that points to data not located in the current super frame and add the number of frames for recovering the decoder states. Set 'muteFrames$_{SF}$' to the result of this sum.
Establish the corresponding header:

| Data field | Value |
| --- | --- |
| OFL | $min((M_{mean}*L), (OFL_{orig} - m*L*M_{mean}))$ |
| FileMode | 1 |
| MuteIfFirstSuperFrame | 1 |
| muteFrames | muteFrames$_{SF}$ |
| muteSamples | 0 |
| StreamingCheckSum | StreamingCheckSum$_{SF}$ |

Copy frames number $(m*M_{mean})$ to $min(((m+1)*M_{mean})-1, NumFrames -1)$, wherein the min function is required for the last super frame because the last super frame could carry a different number of frames and samples.
Decoding Processing for the File or Bit Stream The decoding processing flow chart of FIG. 5 describes the decoding process for archival mode files and for streaming mode bit streams. At the beginning of the decoding process the decoder states are set to their default values (e.g. a mapping buffer is set to zero and previously decoded values are set to zero). In step/stage 1 the input file or bit stream is available for reading the required data.

Step/stage 2 finds and reads the first header of the file or bit stream, i.e. the header information items of Table 1 are set, stored or loaded. Step/stage 3 sets the variable 'SamplesToMute' to its default value zero.

In step/stage 4 the 'MuteIfFirstSuperFrame' data field of the file or bit stream header is checked for deciding whether the decoder states are known (MuteIfFirstSuperFrame=0), or the decoder states must be re-initialised and a number of samples are to be ignored. The number of ignored (muted) samples is calculated in step/stage 5 as SamplesToMute=muteFrames*L+muteSamples from the number 'muteFrames' of frames to mute and the number 'muteSamples' of samples to mute received from the file or bit stream header. 'L' is the number of samples that are decoded from one frame, which is a known decoder constant. Step/stage 6 decodes all received frames which includes also the first 'muteFrames' frames. Hence 'OFL' decoded samples are passed to the next step/stage. Although the first 'SamplesToMute' samples are invalid, they are used for initialising the decoder states.

Hence the following step/stage 7 removes the invalid 'SamplesToMute' samples and returns only the remaining samples to step/stage 8. The number of remaining samples is the difference between the value 'SamplesToMute' and the total number OFL of decoded samples. In case that 'SamplesToMute' is greater than OFL, zero samples are returned to step/stage 8. This can happen in the streaming-mode if the number of frames per super frame is less than the number of frames to mute.

Therefore the remaining delay is to be transferred to the next super frame. A corresponding variable MuteNextSF=SamplesToMute−OFL is calculated in step/stage 9 in order to store the number of samples to mute in the next super frame.

At step/stage 10 the decoding processing is finished 11 for an archival mode file or bit stream or a cut file bit stream because all OFL samples of the file have been decoded.

Thus, step/stage 10 checks the 'FileMode' and proceeds to END step 11 for stopping the archival mode decoding process. Otherwise, decoding of the streaming-mode bit stream is to be continued.

Therefore the 'StreamingCheckSum', for example a CRC, is computed from the frame data of the currently decoded frame in step/stage 12. The processing and the data used for the 'StreamingCheckSum' computation must produce identical results in the encoder and the decoder. Furthermore, the 'StreamingCheckSum' should represent a clear identification of the current frame because it is used for verifying the consistency of the decoder states of the next super frame. Therefore the used data should diversify from super frame to super frame and represent the coded data of the super frame.

Upon switching to the next super frame, step/stage 13 searches and reads the header of the next super frame. This step/stage re-initialises all bit stream header variables so that the former header information is lost. Upon reaching the end of the file, or in case no valid bit stream header has been found, the decoder will proceed to step 11 and stop the decoding.

Otherwise it is to be checked for decoding the next super frame whether the current decoder states are valid.

A streaming mode bit stream file can consists of two or more successive coherent bit streams. Therefore it is to be checked whether the following super frame is the first super frame of a new coherent bit stream, because in such case the current decoder states belong to a different bit stream and are to be reset to the default values. The first super frame of a coherent bit stream has a 'MuteIfFirstSuperFrame' value of zero. Therefore the 'MuteIfFirstSuperFrame' value is inverted in step/stage 14 and is assigned to the variable 'FirstSuperFrame', i.e.
FirstSuperFrame=NOT(MuteIfFirstSuperFrame).

Step/stage 15 checks variable 'FirstSuperFrame' whether a new coherent bit stream is starting. If true, step/stage 17 resets the decoder states and starts decoding of the next super frame at step/stage 3. This is identical to starting decoding of a new file, and is also identical to the decoder initialisation phase 1 of the streaming-mode section in this description. Otherwise the next super frame belongs to the same coherent bit stream and the processing continues in step/stage 16.

Here, the 'StreamingCheckSum' value of the current super frame bit stream header is compared with the 'StreamingCheckSum' value computed from the previous super frame data in step/stage 12, i.e. is CRC==StreamingCRC ?

This is necessary because a super frame of the current coherent bit stream might be missing, or a new coherent bit stream is starting but not at its first super frame.

In case the consistency-check of step/stage 16 fails, step/stage 17 is used to reset the decoder states and then decoding of the next super frame starts at step/stage 3. Therefore the processing is in the decoder initialisation phase 3 of the streaming-mode section in this description and the decoding is started with default decoder states, which leads to the decoder initialisation phase 2 in step/stage 4.

Otherwise the current decoder states are valid for decoding of the current super frame and the current processing is in the decoding phase 1 of the streaming-mode section in this description. Consequently, the 'muteFrames' value of the current bit stream header needs not be evaluated. This is ensured by step/stage 18 which sets the 'MuteIfFirstSuperFrame' variable to zero. Therefore step/stage 4 will not lead to step/stage 8 and the 'muteFrames' value of the current super frame will not be used.

The decision of step/stage 19 is made for transferring a remaining delay of the previous super frame to the current super frame. If 'MuteNextSF'>0, the number of samples to mute of the previous super frame was greater than the 'OFL' value of the previous super frame. Consequently the number 'SamplesToMute' of samples to mute of the current super frame is equal to the remaining number 'MuteNextSF' of samples to mute of the previous super frame. Therefore step/stage 20 sets SamplesToMute=MuteNextSF.

Accordingly, decoding of the current super frame must start at step/stage 4 in order to omit the re-initialisation of 'SamplesToMute' in step/stage 3.

If in step/stage 19 parameter MuteNextSF≤0, there are no remaining samples to mute and the decoder states are correct and the decoding of the current super frame can start directly with the first frame. The number of samples to mute is set to zero in step/stage 3.

In Streaming mode the decoding of successive super frames is repeated until step/stage 13 does no more find a bit stream header, and the decoding processing is stopped in step 11.

Thus, the invention facilitates processing of a frame based bit stream format in archival mode bit stream or streaming mode bit stream, and enables a sample-exact cutting of the archival mode bit stream, even if decoding of one frame requires information from previous frames. As mentioned above, the inventive decoding processing is used in a hd3 decoder implementation and is tested successfully.

A HD3 file in it simplest format has three mandatory data sections shown in FIG. 6, and up to four optional data sections. The mandatory hd3ID data section provides file-mode, length, and CRC information. This hd3ID section is encapsulated in an ancillary data section (silence PCM) of an mp3 frame. Such ancillary data section of an mp3 frame may also contain a Xing- or VBRi-compliant variable bit rate header in front of the hd3ID information.

The mandatory mp3-data section encapsulates the mp3 data stream or parts thereof. The synchronisation words of the mp3 stream may be scrambled.

The mandatory cd-data section provides the lossless extension to the mp3 data for reconstructing a mathematically lossless copy of the original music with one or two audio channels having a temporal resolution corresponding to 32 kHz, 44.1 kHz or 48 kHz and an amplitude resolution of 16 bit/sample. An unsynchronisation scheme can be used that avoids the occurrence of mp3 sync headers.

An optional hd-data section (not depicted) enables lossless reconstruction of high-definition studio formats with up to 24 bit/sample and sampling rates of 192 kHz.

The optional ID3/ID3v2 data section stores metadata relating to the embedded mp3 encoded and the lossless reconstruction encoded music. There may also be an optional ID3v1 tag at the very end of the HD3 file (not depicted).

The invention can also be used for other codecs or bit streams like AAC, and in mp3 where the additional data (e.g. the headers) are arranged in mp3 ancillary data fields, which a corresponding mp3 decoder can evaluate.

The invention claimed is:

1. A method for starting, in a decoder apparatus, a decoding of a frame based bit stream format file that represents an hd3/mp3 audio signal, said bit stream including at least one bit stream header section, said frames including encoded hd3/mp3 audio signal data, wherein data required for a decoding of data of a current frame, or an evaluation of data of a current frame, is/are contained in one or more previous frames, and wherein in said header section, information items are arranged representing:

total number of samples per channel for said file;
   an 'archival mode' or a 'streaming mode' for said file;
   whether or not a decoding of said encoded audio signal data starts at the first frame of said file wherein, if not true, the decoding of a current frame requires knowledge of decoding states initialization data from one or more frames previous to said current frame;
   if a decoding of said encoded audio signal data is not to start at said first frame of said file, a number of initial frames to mute while decoding states are initialized, and if there is a sample-exact cutting feature, a number of samples to mute in the corresponding frame;
   in said streaming mode, a value for identifying a previous super frame for a consistency check, wherein in said archival mode, said file includes a single bit stream header section and successive ones of said frames, and a decoding of said encoded audio signal data is to start with the first one of said frames, and wherein in said streaming mode said bit stream contains more than one super frame, each one of said super frames starting with a single bit stream header section followed by several ones of said frames, and a decoding of said encoded audio signal data is initialized at each one of said super frames, and wherein said information item regarding the number of initial frames to mute signalizes how many ones of initial frames in a current super frame are required for establishing data for initializing states of a decoding of said audio signal data before actually starting decoding of encoded audio signal data from the following frame or frames of said current super frame, such initial frames not being used for decoding the encoded audio signal data contained therein, said method comprising the steps of:

when starting decoding of said streaming mode bit stream at said first super frame, the decoding of the encoded audio signal data starts at the first frame of that super frame using default decoder states;
   when not starting decoding of said streaming mode bit stream at said first super frame, following a decoding initialization or reset, a number 'muteFrames' of frames corresponding to said information item regarding the number of initial frames to mute is used for initializing the decoding states, and the decoding of encoded audio signal data starts at frame number muteFrames+1 of the current super frame using these decoding states;
   when not starting decoding of said streaming mode bit stream at said first super frame, and consistency check data that were calculated from the previous super frame data is not consistent with corresponding consistency check data calculated from the current super frame, using a number 'muteFrames' of frames of the following super frame for re-initializing the decoding states starting decoding of encoded audio signal data at frame number 'muteFrames'+1 of that following super frame using these decoding states;
   when not starting decoding of said streaming mode bit stream at said first super frame, and a super frame was decoded before and said consistency check data are valid, using the decoder states of the previously decoded super frame to decode the encoded audio signal data of the frames of the current super frame.

* * * * *